United States Patent [19]

Baas

[11] 4,226,721
[45] Oct. 7, 1980

[54] FILTER PRESS

[75] Inventor: Hendrik B. Baas, Halsteren, Netherlands

[73] Assignee: B.V. Machinefabriek en Ijzergieterij Holland-, Bergen op Zoom, Netherlands

[21] Appl. No.: 23,187

[22] Filed: Mar. 23, 1979

[30] Foreign Application Priority Data

Mar. 31, 1978 [NL] Netherlands ......................... 7803430

[51] Int. Cl.² ...................... B01D 25/12; B01D 25/38
[52] U.S. Cl. .................................. 210/225; 210/230; 100/198
[58] Field of Search ............... 210/225, 224, 230, 236; 100/196, 198, 199

[56] References Cited

U.S. PATENT DOCUMENTS

| | | | |
|---|---|---|---|
| 3,637,082 | 1/1972 | Bentzien | 210/225 |
| 3,780,747 | 12/1973 | Stadie et al. | 134/43 |
| 3,823,826 | 7/1974 | Wieland et al. | 210/225 |
| 3,826,374 | 7/1974 | Busse et al. | 210/225 |
| 4,082,663 | 4/1978 | Sato | 210/79 |
| 4,132,647 | 1/1979 | Sakuma | 210/230 |

FOREIGN PATENT DOCUMENTS

| | | | |
|---|---|---|---|
| 1810112 | 6/1970 | Fed. Rep. of Germany | 210/230 |
| 4640144 | 9/1968 | Japan | 210/225 |
| 44-14279 | 6/1969 | Japan | 210/225 |
| 1003954 | 9/1965 | United Kingdom | 210/225 |

Primary Examiner—Charles N. Hart
Assistant Examiner—David R. Sadowski
Attorney, Agent, or Firm—John P. Snyder

[57] ABSTRACT

Filter press consisting of a frame having a fixed head, with guides for filter plates provided with communicating ducts and having supply and discharge connections and with a loose head having a clamping device for clamping a set of filter plates against the fixed head, wherein a carriage or slide is situated above the filter plates for travel along horizontal guides and is provided with means which can be moved vertically with respect to the carriage or slide to release a plate from the set of plates and establish a coupling with the plate such that the plate is driven when the carriage or slide is moved.

9 Claims, 2 Drawing Figures

FILTER PRESS

This invention relates to a filter press consisting of a frame having a fixed head, with guides for filter plates provided with communicating ducts and having supply and discharge connections for the liquid for filtration and for the filtrate, and with a loose head having a clamping device for clamping a set of filter plates against the fixed head.

Filter presses of this kind have to be opened from time to time, by shifting the loose head and displacing the plates one by one manually or mechanically. The filter cake then drops out between the plates itself or has to be removed if the cake is so adhesive that it cannot be released of itself. After the filter cake has been removed from all the plates, the latter are again pushed against the fixed head and the clamping system is operated again.

In the known devices using mechanical means for displacing the plates, the outermost plate is usually pulled away from the set of plates, release from the preceding plates being effected by the impact of the movement of the plate. If, as is frequently the case in modern devices, the plates are of lightweight construction and the filter cake is any way tacky, the release of a plate does not take place and a group of plates sticking to one another is displaced so that the press is inadequately emptied.

The object of the invention is to provide a sysem with which a plate is reliably released from the rest of the set of plates and also the plates can be cleaned automatically in a simple manner.

To this end, according to the invention, a carriage or slide adapted to travel along horizontal guides connected to the frame is situated above the filter plates, the carriage or slide is provided with means which can be moved vertically or substantially vertically with respect to the carriage or slide to release a plate from the set of plates and establish a coupling between the carriage or slide and the plate so that the released plate is driven when the carriage or slide is moved. Consequently, a single plate is reliably released and displaced to the required position for the release of the cake.

According to another feature of the invention, the carriage or slide may be provided with means for scraping the filter cake off the filter cloth of the released plate. By disposing the plate release means in the carriage or slide movable above the filter plates, there is the advantage that as soon as a plate is released and coupling established between the carriage or slide and the plate the position of the released plate is exactly fixed with respect to the carriage or slide. By disposing the means for scraping off the filter cake also on the carriage or slide, these means also have an exactly fixed position with respect to the filter plate. Cleaning off the filter plate can therefore now take place automatically after the plate has been released. Suitable programming of the horizontal displacement of the carriage or slide also ensures that the scraper sysem treats both the displaced filter plate and the front of the next plate that has not yet been displaced.

According to the invention, the carriage or slide may be provided with means for spraying the plates clean. The same remarks apply in this case because the position of these cleaning means is completely fixed with respect to the means for scraping the cake off and for holding the plate fast.

According to the invention the means for scraping off the filter cake and the means for spraying the filter cloth clean may be combined. This gives a very compact construction of the system, and the means can be mounted on one and the same support.

According to the invention, the means for releasing a plate may be formed by at least one wedge-shaped part which is disposed at the bottom end of a vertically or substantially vertically movable rod.

By using a vertically movable wedge-shaped part, said part can be pressed between the two adjacent plates or between two portions forming part of these plates. The plate is thus always reliably released with respect to the preceding plate and none of the plates can stick to another.

According to the invention, one or more fork-shaped parts may be disposed on the rod and when the rod is moved downwards said parts engage around an edge of a filter plate or a part connected thereto. With such a construction, when a plate is released from the preceding plate the fork-shaped part will automatically engage around the edge of the filter plate in the correct position. After release, the plate is then automatically coupled to the carriage or slide.

According to the invention, the drive mechanism for the carriage or slide and for the means disposed thereon can be controlled by switches actuated by their coming to a specific distance from a plate of the system, the control also being effected by a fixed program which comes into operation after the release of a plate has started. The actuating means for the switches may, for example, come into contact with a plate or may react when it has approached the plate as far as a specific distance.

Since the position of a released plate is exactly fixed with respect to the carriage, all the subsequent operations can be carried out automatically by means of a program.

The invention will be explained in greater detail in the following description of one exemplified embodiment with reference to the drawing in which.

Figure 1:
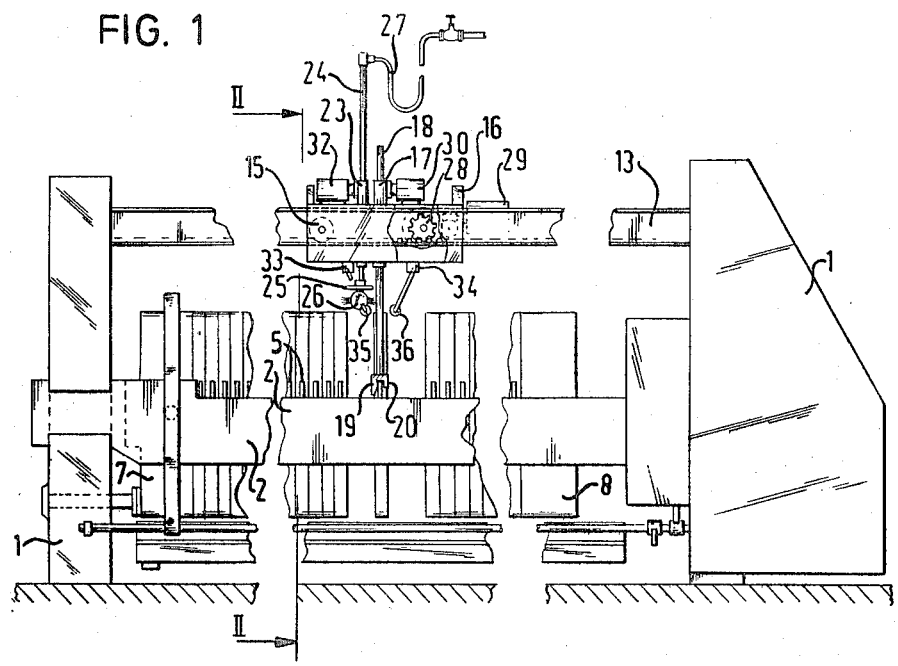
FIG. 1 shows a filter press according to the invention in side elevation.

The press consists of a frame 1. Longitudinally extending support members 2 and 3 are disposed in the frame and filter plates 4 rest thereon by means of lugs 5 and 6. The frame also contains a fixed head 7 and a movable head 8. The filter plates 4 can be combined into a set of clamping them by means of the loose head 8 against the fixed head 7.

Figure 2:
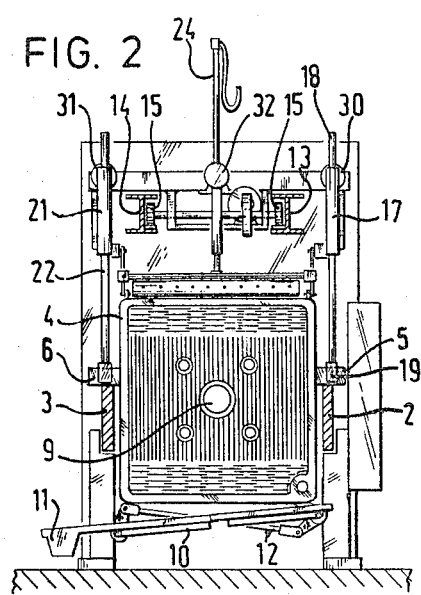
FIG. 2 is a cross-section of the filter press in FIG. 1 on the line II—II in FIG. 1.

The filter plates 4 are provided in known manner with openings which communicate with one another and by means of which the liquid to be filtered can be supplied, e.g. via connections disposed in the fixed head 7. In FIG. 2, the opening through which the filtrate is supplied may, for example, be situated centrally as shown at 9. A filter cloth bears against the plates 4 in known manner so that the liquid supplied via the openings 9 always reaches a chamber bounded by the filter cloth. A cake is deposited on this filter cloth while the liquid can be discharged via openings in the plates.

When a filter cake of sufficient thickness has formed on the filter cloth, the cake must be removed, because otherwise the filter system becomes inoperative.

The supply of liquid for filtration is then stopped and the clamping between the plates 4 is released by pushing the loose head 8 in FIG. 1 to the right. The plates can then be pulled loose one by one and the cake will usually drop down as a result of the impact and can be collected on collector devices 10 disposed beneath the plates 4. The liquid running out of the plates can be discharged via a gutter 11. By means of a lever system 12, the collector device 10 can be pivoted downwards after the style of two flaps so that the cake drops from the flaps.

If the filter material is to some extend tacky and the filter plates, for example, are made of plastics so that they are very light, there is a risk that the filter plates 4 may stick together so that it is difficult to separate each plate individually from the preceding plate.

To this end, according to the invention the frame contains a guide sysem consisting of two members 13 and 14. A carriage 16 can be moved along the members 13 and 14 by means of wheels 15. The carriage 16 bears a rod 18 movable vertical in a guide 17. At the bottom, the rod is provided with a wedge-shaped part 19 and a fork-shaped part 20. A similar guide 21 with a rod 22 movable vertically therein is disposed on the other side of the carriage. The bottom end of the rod 22 again bears a fork-shaped part and a wedge-shaped part unnumbered.

The carriage 16 also has a vertical guide 23 with a rod 24 movable therein. At the bottom end the rod 24 has a scraper in the form of a horizontal plate 25, while a spray device 26 is also provided, to which liquid can be supplied via the hollow rod 24, which for this purpose is connected at the top to a hose 27. Carriage 16 is driven via pinions 28 by means of an electric motor 29, while the rod 18 can be driven by a motor 30 via a rack transmission. The rod 22 can be driven by a motor 31 and the rod 24 is driven by a motor 32. The drive for the motors can be controlled in known manner by means of a program. Switches 33 and 34 with actuating means 35 and 36 are also provided. These switches 33 and 34 can render the system operative, whereupon the various motors are operated to a fixed program.

The system now operates as follows: The carriage is driven via the motor 29 and runs above the set of plates 4, e.g. in the direction of the fixed head 7. As soon as the actuating means 35 of switch 33 comes into contact with a plate 4 of the set of plates, the motor 29 will still perform a specific number of revolutions so that the wedge-shaped part 19 at the bottom end of the rod 18 just stops above the joint between the first two plates of the set. The motor 30 is then operated and moves the rod 18 downwards, so that the wedge-shaped part 19 presses the first plate 4 away because this part presses between the lugs 5. The fork-shaped part 20 then comes just above the lug and on a further downward movement the fork-shaped part will thus engage around the lug 5. The motor 29 is then started again and moves the carriage to the right in FIG. 1. The plate is driven and the motor 29 stops at the required positions and then moves the rod 24 downwards by means of the motor 32. The spray device 26 comes into operation and the filter cake on the shifted plate and on the next plate still bearing against the set of plates, are sprayed with liquid. The scraper 25 then scrapes the cake from both plates 4, the cake dropping down. This is possible because the fork holds the plate 4 at a specific place with respect to the carriage 16. Consequently, the position of the plate with respect to the scraper 25 is also fixed so that the scraper can scrape the cake from the plate correctly. When the cake has been removed, the rod 24 agains moves upwards, and the plate can then be further sprayed clean whereupon the carriage moves to the right until the arm 36 of the switch 34 comes into contact with the cleaned plates already bearing against the loose head 8. The carriage then moves a small predetermined distance and then stops, whereupon the rod 18 is moved upwards. The cleaned plate 4 then bears against the set of plates that has already been cleaned and rests against the loose head. When the carriage is moved to the left by means of the motor 29 the cycle is repeated and the next plate is released and cleaned. The process can therefore take place completely automatically.

What I claim is:

1. A filter press comprising, in combination:
   a frame having a fixed head and a movable head and means for moving said movable head toward and away from the fixed head respectively to clamp and to release a stack of filter plates disposed therebetween, and means for passing liquid to be filtered through said filter plates when the latter are clamped between the heads;
   a carriage movable horizontally along said frame above the filter plates, coupling means mounted on said carriage for selectively engaging a filter plate when said movable head has been moved away from said fixed head to release said stack of filter plates, means for moving said carriage a predetermined distance after said coupling means has engaged a filter plate whereby to move such engaged plate to a position clear of other filter plates, and cleaning means mounted on said carriage for cleaning filter cake from said filter plate engaged by said coupling means, said coupling means and said cleaning means being mounted on said carriage at fixed locations thereon whereby the coupling means positively locates the engaged filter plate with respect to the carriage and the cleaning means and moves the engaged filter plate with the carriage to preserve such positive location when the carriage is moved to position the engaged filter plate at said position clear of other plates.

2. A filter press according to claim 1, characterised in that said cleaning means comprises means for scraping the filter cake off the engaged plate.

3. A filter press according to claim 2, characterised in that said cleaning means also includes means for spraying the plates clean.

4. A filter press according to claim 1 characterised in that said coupling means is formed by at least one wedge-shaped part which is disposed at the bottom end of a vertically or substantially vertically movable rod.

5. A filter press according to claim 4, characterised in that one ore more fork-shaped parts are also disposed on the rod and when the rod is moved downwards said parts engage around an edge of a filter plate or a part connected thereto.

6. A filter press according to claim 1 characterised in that the drive mechanism for the carriage or slide and for the means disposed thereon are controlled by switches actuated by their coming to a specific distance from a plate of the system, the control also being effected by a fixed program which comes into operation after the release of a plate has started.

7. A filter press as defined in claim 2 wherein said means for scraping is of a width to bridge between said engaged filter plate and a filter plate adjacent thereto and said engaged filter plate is moved by the carriage to a position allowing said means for scraping simultaneously to scrape filter cake from such plates.

8. A filter press comprising a frame having a fixed head and a movable head between which are adapted to be clamped a stack of filter plates upon which filtrate is accumulated, means for moving said movable head toward and away from said fixed head to respectively clamp and unclamp the stack of filter plates therebetween, carriage means for traveling longitudinally along guides of said frame and along the stack of filter plates, coupling means mounted on said carriage means so as not to be movable in said longitudinal direction with respect to said carriage means, said coupling means for separating a first of the filter plates of the stack of filter plates from an immediately next adjacent filter plate of the stack of filter plates, and cleaning means carried by said carriage means for moving between the first and next adjacent filter plates and removing filtrate at least from the first plate, said coupling means and said cleaning means being mounted on said carriage at relatively fixed locations thereon whereby the coupling means causes said first plate to be located properly with respect to the cleaning means.

9. A filter press comprising a frame having a fixed head and a movable head between which are adapted to be clamped a stack of filter plates upon which filtrate is accumulated, means for moving said movable head toward and away from said fixed head to respectively clamp and unclamp the stack of filter plates therebetween, carriage means for traveling along guides of said frame and along the stack of filter plates, coupling means carried by said carriage means for wedgingly separating a first of the filter plates of the stack of filter plates from an immediately next adjacent filter plate of the stack of filter plates a predetermined first distance, means for thereafter moving said carriage means in a direction to move said first filter plate further from said next adjacent filter plate to a point defining a second predetermined distance between said first and next adjacent filter plates, cleaning means carried by said carriage means for moving between the first and next adjacent filter plates only after said second predetermined distance has been established for removing filtrate from opposing faces of said first and next adjacent filter plates, said coupling means and said cleaning means being mounted on said carriage at fixed locations thereon whereby the coupling means positively locates said first filter plate not only with respect to said carriage but also with respect to said cleaning means.

* * * * *